(12) United States Patent
Brown

(10) Patent No.: US 6,229,451 B1
(45) Date of Patent: *May 8, 2001

(54) APPARATUS AND METHOD OF MONITORING A POWER TRANSMISSION LINE

(75) Inventor: Fred A. Brown, Spokane, WA (US)

(73) Assignee: LineSoft Corporation, Spokane, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/562,794

(22) Filed: May 2, 2000

Related U.S. Application Data

(63) Continuation of application No. 09/023,835, filed on Feb. 13, 1998, now Pat. No. 6,097,298.
(60) Provisional application No. 60/038,290, filed on Feb. 20, 1997.

(51) Int. Cl.$^7$ .................................................... G08B 21/00
(52) U.S. Cl. .......................... 340/657; 340/580; 340/658; 340/686.2; 324/126; 324/492
(58) Field of Search .................................... 340/657, 580, 340/658, 686.2, 870.07, 870.29, 660, 664, 668; 324/126, 127; 364/492, 481, 483

(56) References Cited

U.S. PATENT DOCUMENTS

| | | | |
|---|---|---|---|
| 4,210,902 | 7/1980 | Palekhin et al. | 340/870.07 |
| 4,268,818 | 5/1981 | Davis et al. | 340/870.38 |
| 4,420,752 | 12/1983 | Davis et al. | 340/870.17 |
| 4,686,325 | 8/1987 | Marsico et al. | 174/40 |
| 4,795,973 | 1/1989 | Smith-Vaniz et al. | 324/126 |
| 4,806,855 | 2/1989 | Davis | 324/127 |
| 4,808,917 | 2/1989 | Fernandes et al. | 324/127 |
| 5,029,101 | 7/1991 | Fernandes | 340/601 |
| 5,181,026 | 1/1993 | Graville | 340/870.28 |
| 5,235,861 | 8/1993 | Seppa | 73/862.391 |
| 5,426,380 | 6/1995 | Maraio et al. | 324/126 |
| 5,517,864 | 5/1996 | Seppa | 73/862.391 |
| 5,696,491 | 12/1997 | White et al. | 340/657 |
| 6,097,298 | * 8/2000 | Brown | 340/657 |

OTHER PUBLICATIONS

SAGSEC—Sags and Tensions in Multi–span Tension Section, Power Line Systems Inc., dated Dec. 5, 1997, p. 1–2.
True 3–Dimensional Power Line Modeling, Power Line Systems Inc., dated Dec. 5, 1997, p. 1–3.

* cited by examiner

Primary Examiner—Edward Lefkowitz
Assistant Examiner—Davetta W. Goins
(74) Attorney, Agent, or Firm—Wells, St. John, Roberts, Gregory & Matkin, P.S.

(57) ABSTRACT

The present invention includes an apparatus and method of monitoring a power transmission line. According to one embodiment, an apparatus adapted to monitor a power transmission line supported by a plurality of structures includes a first measuring device located at a position in space; and a second measuring device coupled with the power transmission line, the first measuring device and second measuring device being configured to provide position information of the second measuring device relative to the first measuring device.

25 Claims, 2 Drawing Sheets

PROFILE VIEW

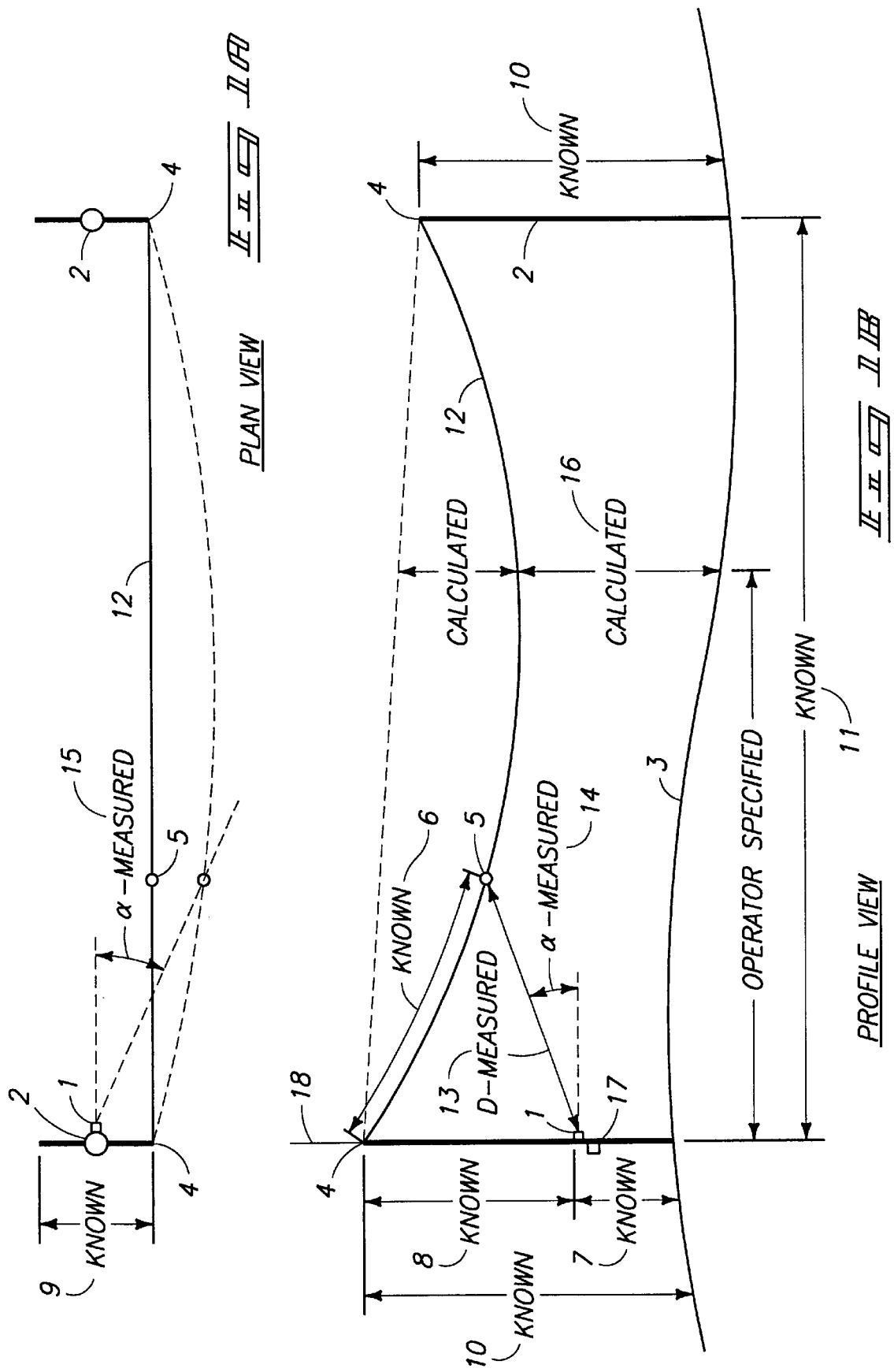

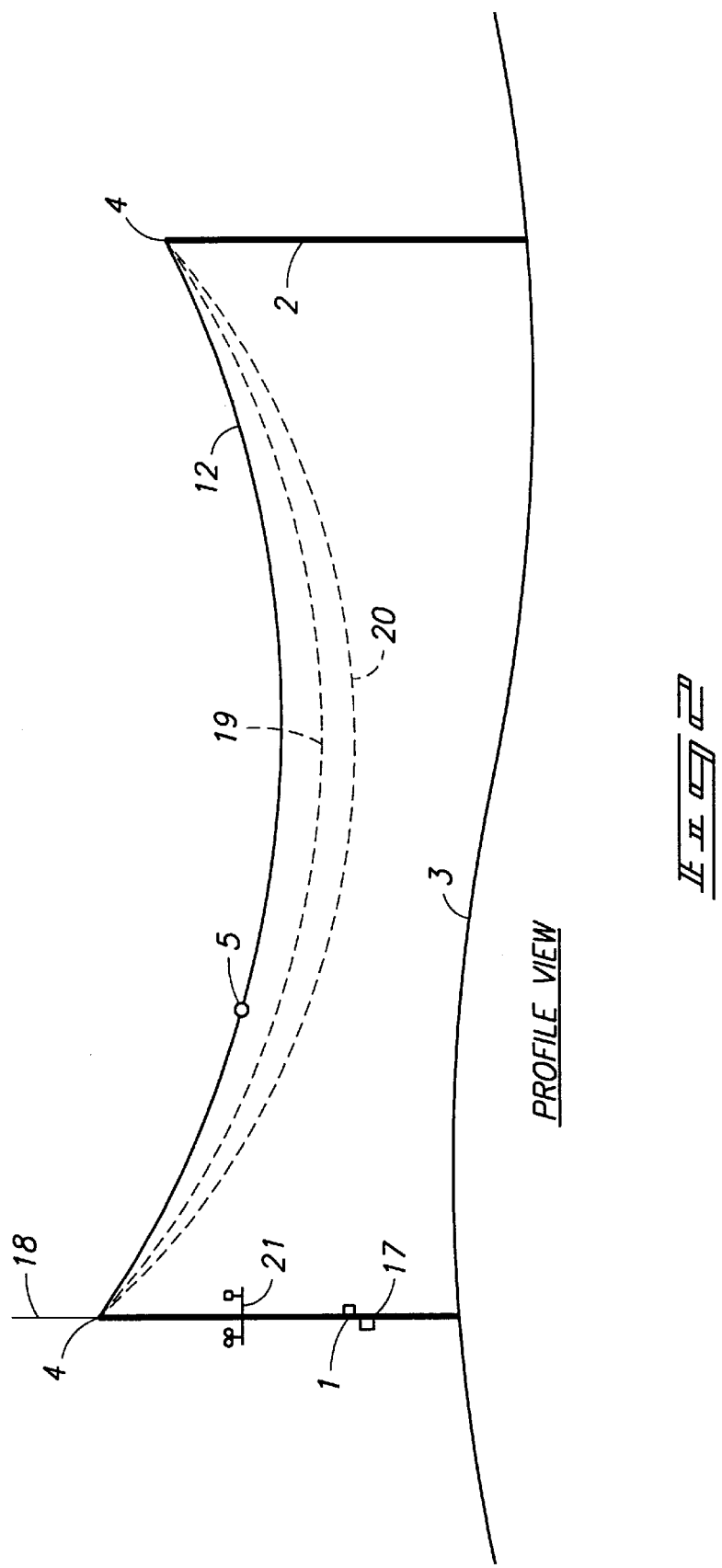

APPARATUS AND METHOD OF MONITORING A POWER TRANSMISSION LINE

CROSS REFERENCE TO RELATED APPLICATIONS

This application claims priority from U.S. Provisional Application No. 60/038,290, filed Feb. 20, 1997, titled "Overhead Power Transmission Line Sag Optical Measuring and Monitoring Process", and incorporated herein by reference.

This patent resulted from a continuation application of U.S. patent application Ser. No. 09/023,835, filed Feb. 13, 1998, now U.S. Pat. No. 6,097,298 entitled "Apparatus and Method of Monitoring a Power Transmission Line", naming Fred A. Brown as inventor, incorporated herein by reference.

TECHNICAL FIELD

This invention relates to automatic, real time measurement of the actual position of an overhead power transmission line (conductor) in three dimensions, including sag and blow-out, for the purpose of dynamic rating of such line's capacity and the ability to verify the design assumptions, using automated optical devices, combined with telemetric means of conveying the information to line operators. This will assist operators in preventing flashover to adjacent objects on earth without the need for human on-site presence, or reliance on theoretical calculations based on assumptions, which may contain inherent errors.

More particularly, an optical device is provided at a known, fixed location relative the line, and a second device is mounted at a known, fixed location on the line itself. A means is provided for automatically and remotely determining the relative position of the two devices and then conveying that information to a distant location. A determination can be made on command or at certain intervals or times, as to how much more or less power can be transmitted over the line and still maintain safe ground and right of way clearances; all without having to de-energize the line or have a person physically observe or measure the line, and can be done at any time, day or night. Moreover, given positions of the line can trigger alarms or other means of automatically notifying the line operator of potentially dangerous conditions along the line.

BACKGROUND OF THE INVENTION

Electrical power line owners have a desire and need to transmit more power over existing power lines. As the amount of power being transmitted over a given line increases, the temperature of the conductor increases. As the temperature of the conductor increases, the sag of the conductor increases. Existing weather conditions such as solar heat, ambient air temperature, wind and heat radiation also affect the amount of sag and swing of the line. Excess sag can put the conductor so close to objects on the earth as to cause flashover, which can damage the line and nearby facilities, cause power outages and endanger animal and plant life. High winds can also act to blow a line sideways, dangerously close to or over the edge of the power line right of way.

This device allows the operator to know the actual position of the conductor without having to measure line temperature, tension or angle, nor wind and air conditions along the line. Knowing the actual position of the line relative to the ground and right of way boundaries allows the line operator to increase or decrease the power transmission appropriately so as to attain the maximum flow of power without violating safety clearances.

Moreover, present calculations of expected blow-out under a given set of conditions of line temperature, wind speed, span length, and such give results in excess of those actually observed. Combining this device with devices to measure environmental conditions such as air temperature, wind speed and direction and solar radiation can assist in developing accurate calculations that more closely match actual observations.

Traditionally, transmission lines were rated based on an assumed combination of worst cooling conditions, consisting of a combination of expected highest ambient temperature, solar radiation and a low wind speed. Such traditional current ratings are highly conservative. To take advantage of this conservatism, methods have been developed to either monitor some of the cooling conditions or the actual temperature of the conductor, and to adjust current ratings based on such monitored data.

In the prior art, a number of methods have been used for estimating line position by estimating its temperature. In one such method, using theoretical calculations, assumptions are made of wind speed and direction, ambient temperature and solar radiation. Calculations are made for arriving at the line condition. Because the calculations are based on theoretical assumptions, the result can be at considerable variance from the actual line condition which might permit greater line current than exists or, on the other hand, mandate a lower actual line current.

In some instances weather stations have been established in the general location of the transmission line in order to monitor the weather to thus provide somewhat more reliable data to calculate the line conditions, including the temperature of the line, and thus its actual position.

A third method for monitoring the line known to the prior art is to provide sensor devices mounted on the conductor along the length of the line at various intervals to measure conductor temperatures, from which load capacity can be determined. These various systems of the prior art are disclosed in the U.S. Pat. Nos. 4,268,818 and 4,420,752 and 4,806,855. These monitors have been somewhat more effective in identifying actual temperatures of the conductors. However, because the sensor modules are mounted on the energized conductor, the manufacturing and installation cost of the sensors is complicated and expensive.

A further disadvantage of these conductor temperature based rating methods is that they cannot take into account the progressive stretching of conductor (creep), caused by variation of conductor loading. Design sag and tension tables of conductors are available to help determine the conductor tension and sag in initial condition (before any creep) and final condition (after calculated maximum creep). However, the resulting uncertainty between the sags can be more than 10% of sag, and equivalent to a temperature uncertainty of 25 to 30 degrees Celsius.

In another method in current use, devices can be installed on the line to monitor the tension in the conductor. Conductor tension is combined with other environmental data, such as the ambient temperature and solar radiation, to predict the rating or electrical capacity of the line. U.S. Pat. Nos. 5,517,864 and 5,235,861, relate to methods of calculating the approximate actual sag of an overhead power transmission line by measuring the amount of tension on the line at 'dead-end' structures, either by tensiometers or swing angle indicators, as well as measuring ambient temperature, both done at two different times, with no power flow, and then remotely transmitting that information to a computer for performance of theoretical calculations. From the data received, a Ruling Span can be calculated from which to determine a maximum safe current that can be transmitted by the existing line without creating excess conductor sag. These methods require removing the line from service on at least two different occasions for a period of time long enough to allow the conductor temperature to reach ambient air temperature.

Israel Electric Company, Haifa, Israel has occasionally used selected algorithms to approximate actual sag under certain combinations of conditions of weather, power transmission and physical design; using basic longitudinal load modeling techniques.

Power Line Systems, Inc. is understood to have a computer program that performs a mathematical analysis of sag and tension, using longitudinal load modeling, including allowance for longitudinal insulator movement.

All of these uncertainties are eliminated by knowing the actual position of the line with real-time measurement.

Methods exist for determining the sagging accuracy by observations. The traditional method has been based on daytime observations of the sag of the line using optical devices, such as transits, or by observing the propagation velocity of transverse vibration of the conductor (bounce method). Such observations are, of necessity, made during daytime. Sag measurements using such techniques are subject to two main error sources: 1) If the line carries a current, the temperature of the conductor cannot be accurately estimated, and 2) even if the line is de-energized, the solar radiation on the conductor can cause up to a 15degree C. temperature rise compared to the ambient, as noted in U.S. Pat. No. 5,517,864.

BRIEF DESCRIPTION OF THE DRAWINGS

Preferred embodiments of the invention are described below with reference to the accompanying drawings, which are briefly described here.

FIG. 1A is a plan view of the application of an optical measuring device and telemetry application.

FIG. 1B is a profile view of the application of an optical measuring device and telemetry application.

FIG. 2 shows the application of the device to alarm triggering conditions.

DETAILED DESCRIPTION OF THE PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This disclosure of the invention is submitted in furtherance of the constitutional purposes of the U.S. patent laws "to promote the progress of science and useful arts" (Article 1, Section 8).

The purpose of this invention is to automatically and remotely measure the actual position of an overhead power transmission line (conductor) in three dimensions, in real-time, at any given span, for the dynamic rating of the power transmission capacity of said line. The function of the invention is to allow maximum safe transmission of power through that line regardless of the accuracy of information about the many factors that limit such power transmission, and to assist in making more accurate mathematical models of the actual forces affecting a power transmission line.

In particular, this invention:

Makes an accurate determination of the actual sag and swing of the conductor relative to the earth, other obstructions and right of way boundaries.

Transmits that information to a system operator at a remote location.

While this invention could be placed on any span or spans in a power line system, placing it at those spans that have the most likelihood of violating ground clearance standards or right of way boundaries (critical spans) would be the most advantageous to the line owner. Little or no advantage would likely be gained placing the invention on every span or even on spans not likely to encounter ground or boundary violations until after a critical span in that section has already done so.

Referring to FIG. 1A and FIG. 1B, a laser-based distance measuring device 1, or other optical distance measuring device, would be located at a known, fixed location, most likely on one of the support structures 2 on either end of the span to be measured. The precise position of the device 1 relative to the earth 3 is known 7, as is its position relative to the support position 4 of the conductor 12 on those structures in both the vertical ("y" coordinate) 8 and horizontal ("z" coordinate) 9 directions. Conceivably the device 1 could be mounted at some other fixed position, for example on another nearby structure, or even on the ground. Such devices are commercially available in a variety of styles and types and could be readily adapted to this use. They may need to be encased in a weather and/or vandal proof case.

A reflector 5 would be attached at a predetermined location along the conductor 12, not necessarily at the center of the span. The precise distance 6 along the conductor 12 from the support structure 2 would be known. Conceivably, the measuring device 1 itself could be mounted on the conductor 12, instead of the reflector 5, and the reflector mounted on the support structure or other known position, although this may not be the best method.

Other known distances would be the horizontal distance 11, in the "x" coordinate, between the two support structures 2 on each end of the span to be measured, and the height 10 of the conductor support position 4 on each such structure 2.

To determine the position of the reflector 5 in space in the x coordinate, the measuring device 1 must have the ability to measure the distance 13 from the device 1 to the reflector 5. To measure the position of the reflector 5 in the y coordinate, the device 1 must be able to turn and measure a vertical angle 14 from horizontal. To measure the position of the reflector 5 in the z coordinate, the device 1 must be able to turn and measure a horizontal angle 15.

Once the position in space (x, y, z coordinates) of the measuring device, and the reflector are known, the measuring device can, either on a continuing basis, periodic basis, or on an as requested basis, determine the precise location of the reflector at such times. With the actual position of the reflector known, combined with the other known distances, the actual sag of the conductor can be precisely determined by available mathematical calculations, and the closest distance 16 to the earth 3 calculated using standard mathematical calculations.

Any optical measuring device, be it laser or otherwise, will need to be eye safe; that is safe to look at with the unprotected eye, so as to not harm casual observers.

The measuring device would then communicate these three measurements, 13, 14 and 15, to a base station or other remote location where these measurements would be used to calculate the actual sag and swing of the entire conductor in the span. Although a clock mechanism could be built into the device 1 to activate measurements at specific times or intervals, the operator may wish to issue commands to the device as to the time or times to take measurements. Consequently this communication device 17 may need to also be able to receive commands to provide immediate measurement or reset such timings or intervals.

This communication could be by any one of a number of different, commercially available means. For example, a cellular phone or radio transmitter/receiver 17 could be located on the same structure 2 as is the measuring device 1, or even elsewhere. Wherever located, the measuring device 1 would be connected to the communication device 17 via a cable, likely shielded. An antenna 18 for the communication device 17 could be mounted atop a support structure 2. If a land line communication system were nearby, either above ground or buried, a hardwire connection could be made to same.

Power for the measuring device 1, the telecommunications and processing system 17 could be from any one of a number of different, commercially available sources. If there is a low voltage system nearby, such as an underbuild distribution conductor, then power could be brought directly from that. Solar panels or replaceable battery, or combination of both could be used. Power might even be drawn by induction from the measured conductor system itself by means of an electro-magnetic induction device installed near the conductor support point 4.

Thus it is shown that the actual position in space of a given position on a conductor is accurately found and made known to a remotely located operator, and the actual position of the conductor accurately determined.

FIG. 2 shows how the conductor's sag might automatically trigger certain alarms at the operator's position. For example, if the conductor were to sag to a position such as shown by line 19 an alarm might automatically sound notifying the operator that there was only a certain amount of sag left before ground clearance safety codes or boundary limits might be violated. If the conductor were to sag further to a position such as that shown by line 20, a different alarm might sound that the conductor was at it's lowest allowable safe point. Moreover, a computer could be programmed to note the speed over time at which the conductor was sagging, and make predictions, using that information and other information known about other variables that affect conductor sag (see above), about when the conductor might sag to a given point at either the then current transmitted power or at some other level specified.

FIG. 2 also shows a possible installation of weather station equipment 21 such as an anemometer, thermometer, solar emissivity meter and wind vain. Data from this equipment can also be telemetrically conveyed to the system operator. This data can be combined with known data on the line, such as the amperage current at the time, type of line and installed tension, to make a mathematical calculation of where the line should be. This can then be compared to the actual position as shown by this invention, to assist in perfecting better mathematical models of actual line performance.

CONCLUSION

This invention is a system of automatically and remotely measuring the actual position in space of a given span of conductor of an overhead power transmission line in real time, and then electronically conveying that information to a remotely located operator, for the purpose of dynamically rating of the line capacity. An important component of the invention is that it can be mounted at any span in the line system, especially in a particularly critical span. A second advantage of the system is the ability to combine real time environmental data with real-time actual line position to study and perfect theoretical conductor performance models.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of determining a position of a portion of an electrical power transmission line located intermediate a plurality of supports coupled with the electrical power transmission line, the method comprising:

providing a position determining device;

coupling the position determining device with the portion of the electrical power transmission line located intermediate the plurality of supports coupled with the electrical power transmission line; and determining the position of the coupled position determining device to determine the position of the portion of the electrical power transmission line.

2. The method according to claim 1 wherein the determining comprises determining using another position determining device configured to determine the position of the coupled position determining device relative to the position of the another position determining device.

3. The method according to claim 2 wherein the determining comprises determining using the position determining devices comprising at least one of an optical distance measuring device and a target.

4. The method according to claim 2 wherein the determining comprises determining using the position determining devices comprising at least one of a laser and a reflector.

5. The method according to claim 2 wherein the determining comprises:

determining the distance intermediate the position determining devices; and determining a plurality of angles defined by the position determining devices.

6. The method according to claim 5 wherein the plurality of angles include a verticle angle and a horizontal angle.

7. The method according to claim 1 wherein the determining comprises determining sag of the portion of the electrical power transmission line.

8. The method according to claim 1 wherein the determining comprises determining swing of the portion of the electrical power transmission line.

9. The method according to claim 1 further comprising:

communicating information of the position determining device after the determining; and receiving the information within a base station.

10. A method of determining a position of a portion of an electrical power transmission line comprising:

providing a first position determining device and a second position determining device;

coupling one of the first position determining device and the second position determining device with a portion of an electrical power transmission line; and determining the position of one of the first position determining device and the second position determining device relative to the other one of the first position determining device and the second position determining device to determine the position of the portion of the electrical power transmission line.

11. The method according to claim 10 wherein the providing comprises providing a first position determining device and a second position determining device individually comprising one of an optical distance measuring device and a target.

12. The method according to claim 10 wherein the providing comprises providing a first position determining device and a second position determining device individually comprising one of a laser and a reflector.

13. The method according to claim 10 wherein the determining comprises:

determining the distance intermediate the position determining devices; and determining a plurality of angles defined by the position determining devices.

14. The method according to claim 13 wherein the plurality of angles include a verticle angle and a horizontal angle.

15. The method according to claim 10 wherein the determining comprises determining sag of the portion of the electrical power transmission line.

16. The method according to claim 10 wherein the determining comprises determining swing of the portion of the electrical power transmission line.

17. The method according to claim 10 further comprising:

communicating information from at least one of the first and second position determining devices after the determining; and receiving the information within a base station.

18. An electrical power transmission line position monitoring system comprising:

a first position determining device;

a second position determining device coupled with a portion of an electrical power transmission line and the first position determining device and the second position determining device being configured to provide position information of one of the first and second position determining devices relative to the other of the first and second position determining devices to provide position information of the portion of the electrical power transmission line; and a base station configured to communicate with at least one of the first and second position determining devices and to receive information from the at least one communicating first and second position determining device.

19. The monitoring system according to claim 18 wherein the first and second position determining devices individually comprise one of an optical distance measuring device and a target.

20. The monitoring system according to claim 18 wherein the first and second position determining devices individually comprise one of a laser and a reflector.

21. The monitoring system according to claim 18 wherein the first and second position determining devices are configured to determine the distance intermediate the first and second position determining devices and a plurality of angles defined by the first and second position determining devices.

22. The monitoring system according to claim 21 wherein the plurality of angles include a verticle angle and a horizontal angle.

23. The monitoring system according to claim 18 further comprising equipment configured to provide weather conditions proximate at least one of the first and second position determining devices.

24. The monitoring system according to claim 18 wherein the first and second position determining devices are configured to provide swing information of the portion of the electrical power transmission line.

25. The monitoring system according to claim 18 wherein the first and second position determining devices are configured to provide sag information of the portion of the electrical power transmission line.

* * * * *